(12) United States Patent
Kondo et al.

(10) Patent No.: US 6,385,250 B1
(45) Date of Patent: May 7, 2002

(54) IMAGE PROCESSING APPARATUS AND IMAGE PROCESSING METHOD

(75) Inventors: Tetsujiro Kondo; Yasunobu Node, both of Tokyo; Takayoshi Fujiwara, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/597,927

(22) Filed: Jun. 19, 2000

Related U.S. Application Data

(63) Continuation of application No. PCT/JP99/05790, filed on Oct. 20, 1999.

(30) Foreign Application Priority Data

Oct. 20, 1998 (JP) ............................................ 10-298920

(51) Int. Cl.$^7$ ................................................ H04N 7/12
(52) U.S. Cl. ................................... 375/240.27; 348/452
(58) Field of Search ........................... 348/403.1, 419.1, 348/441, 445, 446, 448, 452, 458; 375/240.01, 240.12, 240.14, 240.16, 240.21, 240.26, 240.27; H04N 7/12

(56) References Cited

U.S. PATENT DOCUMENTS

| | | |
|---|---|---|
| 4,750,039 A | 6/1988 | Willis |
| 5,260,786 A | 11/1993 | Kawashima et al. |
| 5,381,183 A | 1/1995 | Ishizuka et al. ............ 348/458 |
| 5,517,588 A * | 5/1996 | Kondo ........................ 348/445 |
| 5,646,697 A * | 7/1997 | Kurashige ................... 348/452 |
| 5,790,195 A * | 8/1998 | Ohsawa .................... 348/419.1 |
| 5,844,612 A * | 12/1998 | Israelsen ................ 375/240.14 |
| 5,946,044 A | 8/1999 | Kondo et al. |
| 6,137,835 A * | 10/2000 | Yamashita et al. ........ 348/403.1 |
| 6,144,412 A * | 11/2000 | Hirano et al. ................ 348/448 |
| 6,188,725 B1 * | 2/2001 | Sugiyama .............. 375/240.12 |

FOREIGN PATENT DOCUMENTS

| | | | |
|---|---|---|---|
| EP | 0 263 670 A1 | 4/1988 | .......... H04N/5/262 |
| EP | 0 482 894 A2 | 4/1992 | ............ H04N/5/44 |
| EP | 0 859 513 A2 | 8/1998 | ............ H04N/7/01 |
| JP | 63-104582 | 5/1988 | ............ H04N/5/45 |
| JP | 4-157886 | 5/1992 | ............ H04N/7/01 |
| JP | 6-268905 | 9/1994 | .......... H04N/5/265 |
| JP | 7-264630 | 10/1995 | .......... H04N/11/08 |
| JP | 9-74543 | 3/1997 | ............ H04N/7/01 |
| KR | 96-6532 | 5/1996 | ............ H04N/5/45 |

OTHER PUBLICATIONS

A. Murat Tekalp et al., "High–Resolution Image Reconstruction From Lower–Resolution Image Sequences and Space–Varying Image Restoration," Proceedings of the International Conference on Acoustics, Speech, and Signal Processing (ICASSP), vol. 34, Conf. Mar. 20, 1992, pp. 169–172.

A. Patti et al., "High Resolution Standards Conversion of Low Resolution Video," Proceedings of International Conference on Acoustics, Speech, and Signal Processing, vol. 4, Conf. May 20, 1995, pp. 2197–2200.

* cited by examiner

*Primary Examiner*—Richard Lee
(74) *Attorney, Agent, or Firm*—Bell, Boyd & Lloyd LLC

(57) ABSTRACT

An image processing apparatus improves picture quality and moreover, makes resolution higher, wherein second image data is generated by combining a current image having first image data with an image which is temporality different from the current image, so that an image having high resolution and having less aliasing can be generated as compared with the current image.

16 Claims, 11 Drawing Sheets

| IMAGE DATA S11 | POSITION-CORRECTED IMAGE DATA S20 | ALIASING-CORRECTED IMAGE DATA S5 |

A

B

US 6,385,250 B1

IMAGE PROCESSING APPARATUS AND IMAGE PROCESSING METHOD

This application is a continuation of international application number PCTJP99/05790, filed Oct. 20, 1999 (status, abandoned, pending, etc.).

TECHNICAL FIELD

The present invention relates to an image processing apparatus and an image processing method, and for example, is suitably applied to television receivers.

BACKGROUND ART

Conventionally, a CRT (Cathode Ray Tube) is adopted in a television receiver as a display device for displaying received images. This CRT is designed to display images by sequentially scanning and brightening points on a fluorescent screen with an electronic beam irradiated from the top left to the bottom right.

An image displayed on a CRT in this manner is comprised of the points on the fluorescent screen, i.e. a set of pixels, which can be regarded as digital signals resulting from the sampling of the original image at the pixel positions of the fluorescent screen. For instance, a displayed image obtained by shooting a natural scene is comprised of digital signals obtained by sampling the actual natural scene comprised of analog signals treating the pixel positions of the fluorescent screen as sampling points.

Incidentally, in a television receiver, unless the so-called principle of sampling, i.e. the principle that, in order to reproduce the original analog signals from digital signals obtained by sampling the analog signals, the sampling should be performed at a frequency at least double the maximum frequency of the analog signals, is satisfied in sampling the original image, the signal level widely fluctuates and the ariasing occurs in an image to be displayed on the CRT.

Generally in a television receiver, since images are displayed on the CRT by sequentially scanning the fluorescent screen with an electronic beam from the top left to the bottom right, the horizontal direction in which the scanning line runs is pre-filtered to satisfy the principle of sampling, and the vertical direction orthogonal to the scanning line is not pre-filtered, resulting in the problem of ariasing occurring in the vertical direction of the displayed image.

For instance, in the case of taking note of a random vertical direction in the N-th frame of a displayed image as illustrated in FIG. 11, if the original image in that vertical direction has a signal component of a frequency higher than ½ of the frequency corresponding to a single line (horizontal scanning period) as denoted by solid lines in the figure, the aforementioned principle of sampling is not satisfied, resulting in causing ariasing and preventing the original image from being displayed correctly, but only the image denoted by dotted lines in the figure can be displayed. Such ariasing affects signal processing for Y (luminance signal)/C (color signal) separation, noise removal and picture quality improvement, and various other signal processing which are performed by the television receiver.

Even ariasing occurs, if there is no change in a pixel value at each pixel, only the resolution of the displayed image is deteriorate, but the audience feels no particular awkwardness. However, regarding an image of a scene in which, for instance, a tree covered with many leaves is swaying in the wind, the signal represented by a solid line in the figure in the N-th frame changes to a signal represented by a solid line in the (N+1)-th frame. Change of an image having ariasing in this way makes the audiences feel very awkward.

Incidentally, in the case of taking note of a random single frame of a displayed image, since the displayed image has ariasing in the vertical direction, it is difficult, in view of the principle of sampling, to reproduce the original image having a high frequency component from only that single frame of the displayed image. Also, it is also difficult to reproduce the original image by pre-filtering in the vertical direction an image already having ariasing in the vertical direction.

DISCLOSURE OF INVENTION

The present invention, attempted in view of the above-noted problems, is intended to propose an image processing apparatus and an image processing method which can remarkably improve picture quality as compared with the prior art.

In order to solve these problems, according to the present invention, when second image data is generated from first image data, a plurality of images which are different from a current image data of the first image data with respect to a temporal direction is stored in a plurality of memories, a movement between the current image and each of the plurality of images stored in the plurality of memories is detected, an image stored in any one of the plurality of memories is updated to the current image according to each of the detected movements and moreover, any one of the plurality of images stored in the plurality of memories units is selected according to each of the detected movements to correct the positions of the selected image according to the movement of the image, and the image corrected by a correcting section and the current image are combined to generate the second image data having the larger number of pixels than the first image data.

A movement vector between each of image data stored in a plurality of memories and the current data is detected, and image data in the storage unit is updated and image data to be combined is selected based on the detection results, thereby processing of correcting the position of any of the image data stored in the plurality of memories and combining the resultant with the current image data can be performed with a further improved accuracy.

BEST MODE FOR CARRYING OUT THE INVENTION

An embodiment will be described below with reference to drawings.

(1) Principle of a Method of Removing Reflected Distortion

Here, a method of reproducing the original image from an image having ariasing in a vertical direction (hereinafter called "ariasing image") will be described with reference to FIG. 1. Here, in the case of taking note of a single random row in the vertical direction, the original image in that a single row in the vertical direction is supposed to be represented, as denoted by a solid line in the figure, by a triangular wave which is periodically converted at a frequency higher than ½ of the frequency per line and whose phase shifts in the vertical direction with the lapse of time.

In this event, in the case of taking note of only the N-th frame, an image comprised of sampled values, obtained by sampling the original image on the scanning lines, is different from the original image. Next, in the (N+1)-th frame, in the case of taking note of only that (N+1)-th frame, an ariasing image different from the original image is generated as in the case of taking note of only the N-th frame. However, since the phase of the ariasing image shifts in the vertical direction with the lapse of time, the ariasing image obtained in the (N+1)-th frame is the one in which sampled values, obtained by sampling the original image in different positions from the N-th frame, are connected.

Thereby, an image obtained by shifting sampling points having sampled values in the N-th frame to positions corresponding to the phase change of the original image, i.e. the movement of the ariasing image, and connecting the sampled values at the sampling points after the shift and the sampled values in the (N+1)-th frame is closer to the original image denoted by a dotted line in the figure.

Hereinafter, similarly, the sampling points having the sampled values in the past frame are shifted to positions corresponding to the movement of the ariasing image and the sampled values at the shifted sampling points and the sampled values in the current frame are connected, so that the original image is gradually reproduced.

In this manner, the original image can be reproduced by shifting the sampling points to positions corresponding to the movement of the ariasing image and connecting them and the sampled values at the shifted sampling points. Thus, by supposing pixels at positions corresponding to the movement of the ariasing image, the number of pixels in the vertical direction increases and the principle of sampling is satisfied. As a result, the original image is obtained.

Figure 2:
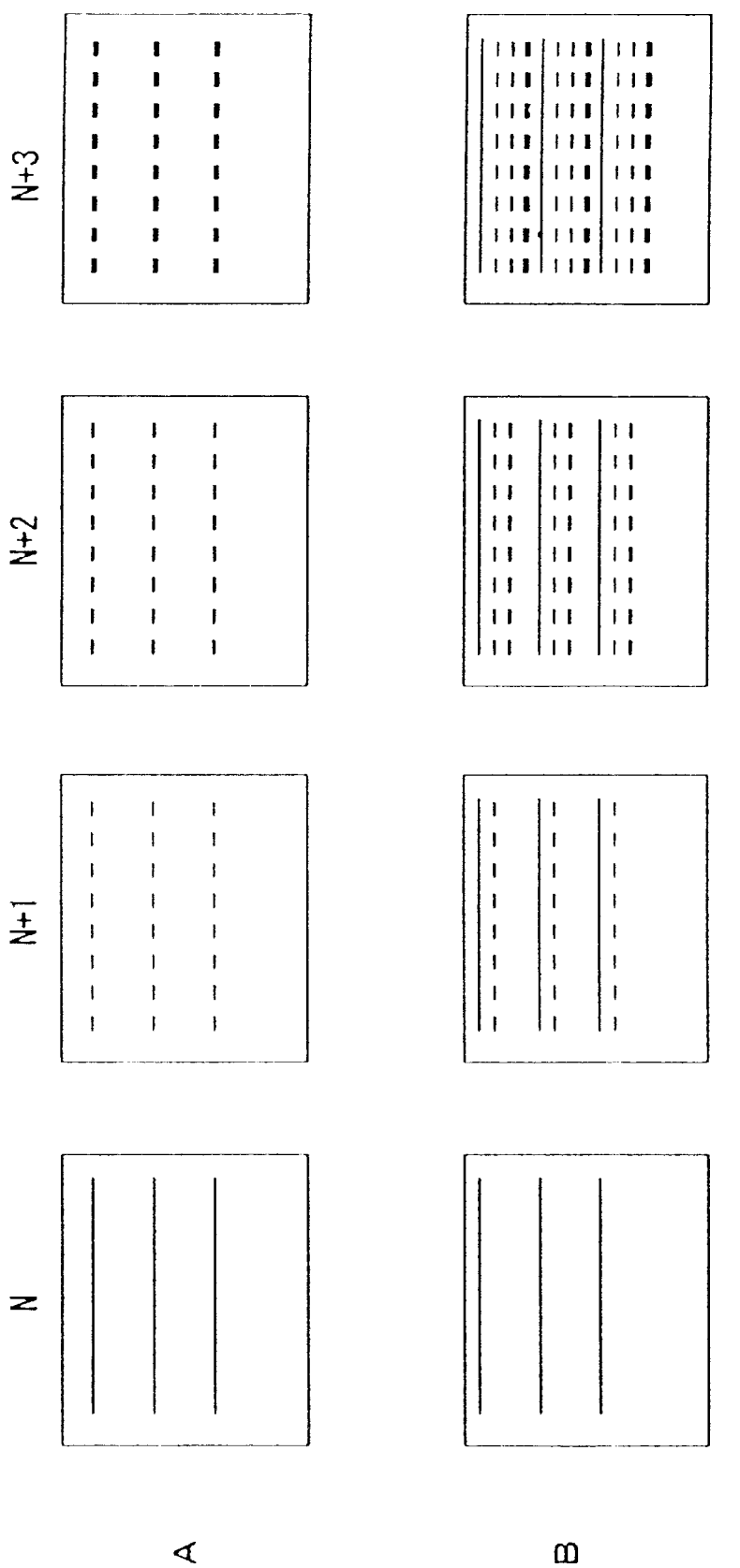
FIG. 2 is a schematic diagram explaining the process to generate an image having no ariasing.

Thus it is so arranged that, as illustrated in FIG. 2, with respect to each of frames of the ariasing image (FIG. 2(A)), which are temporality consecutive, pixels forming the ariasing image of the past frame are supposed at positions corresponding to its movement to generate an image free from ariasing (FIG. 2(B)) comprised of an increased number of pixels in the vertical direction.

Figure 1:
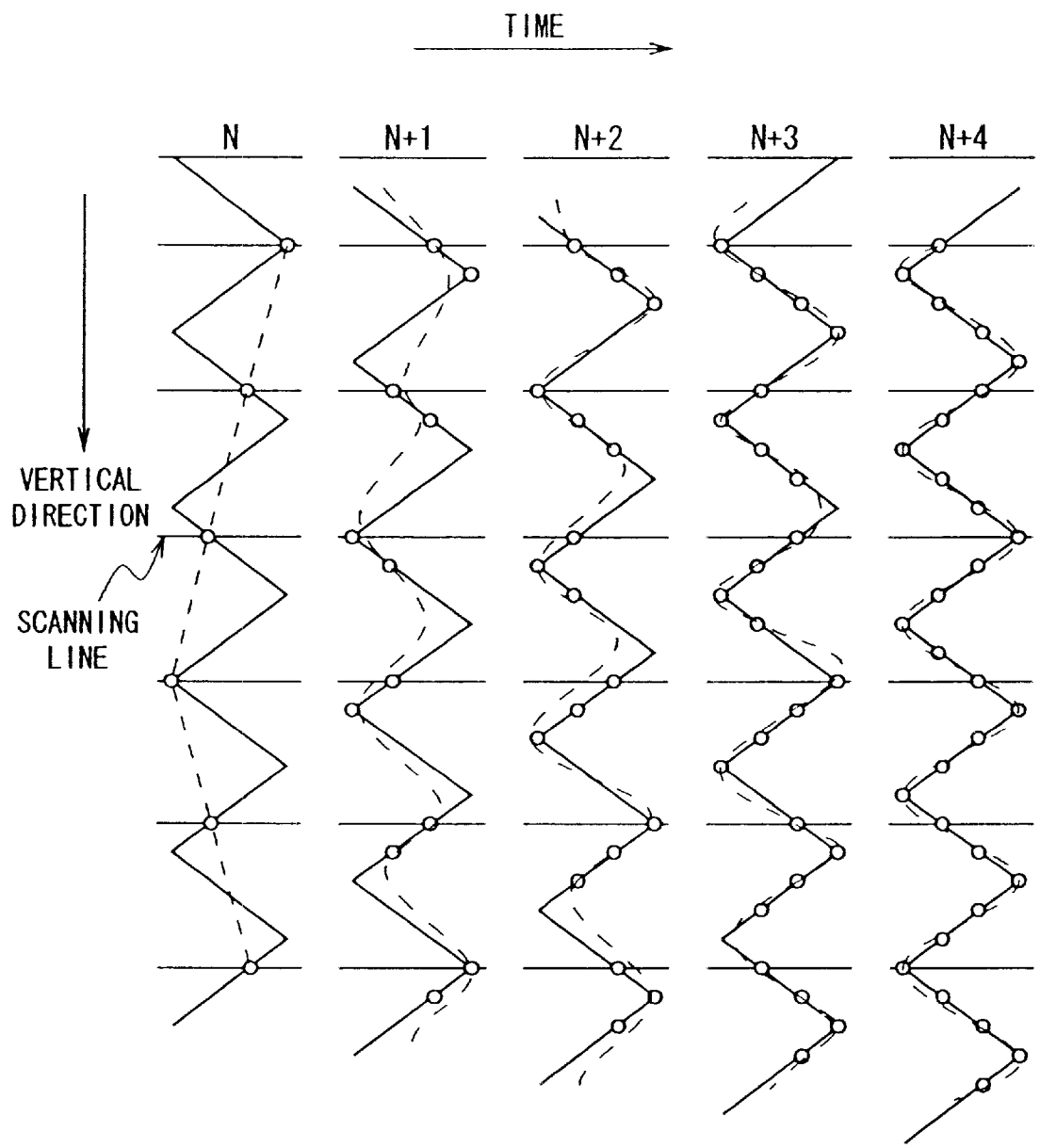
FIG. 1 is a schematic diagram explaining the principle of a method of removing ariasing.
Figure 3:
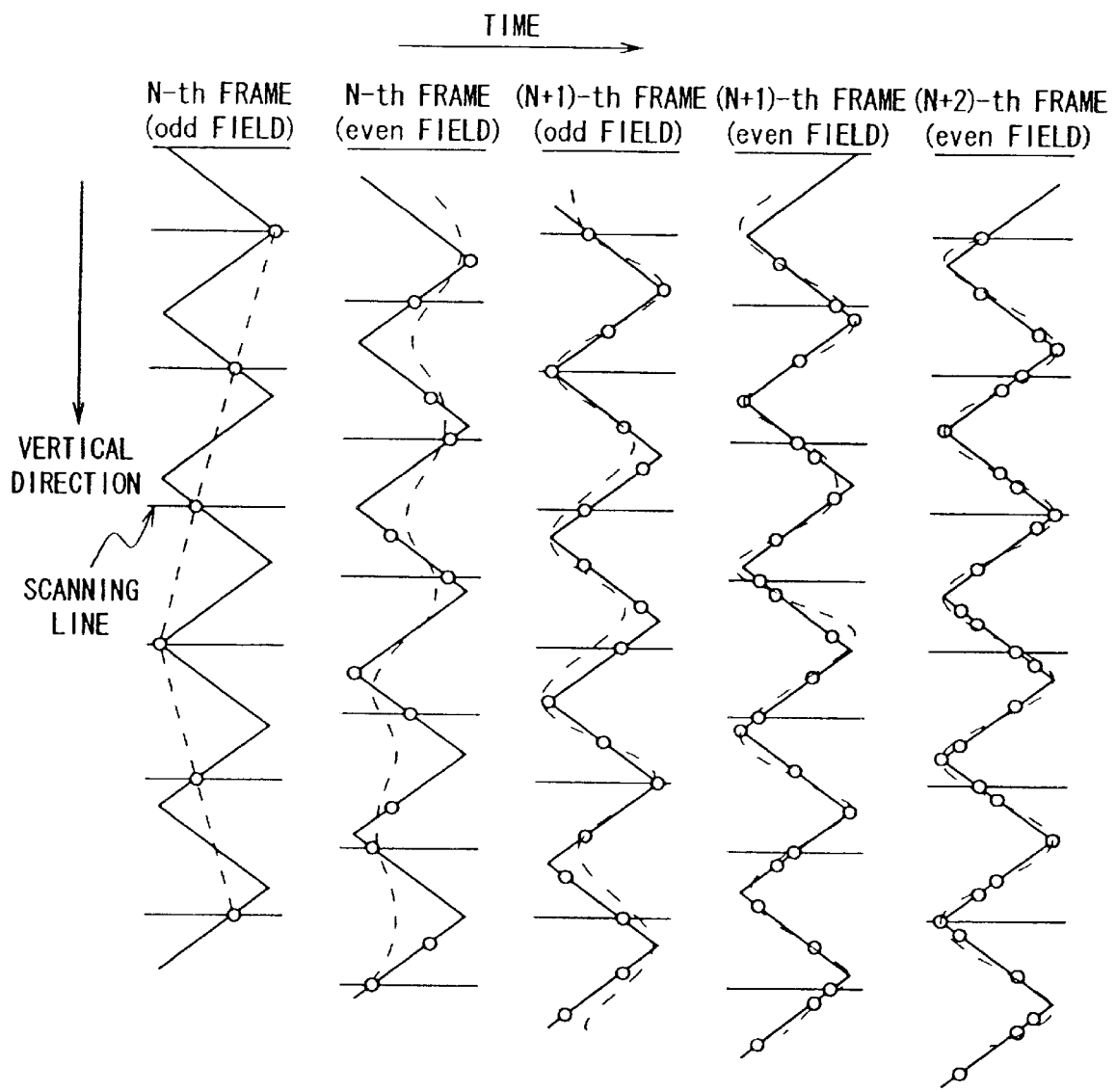
FIG. 3 is a schematic diagram explaining the principle of a method of removing ariasing.

Note that, FIG. 1 is explained with a frame image as a unit. However, with respect to an image in the interlace system which uses a field image as a unit, an odd filed and an even field alternately appear as shown in FIG. 3.

(2) Overall Configuration of the Television Receiver

Figure 4:
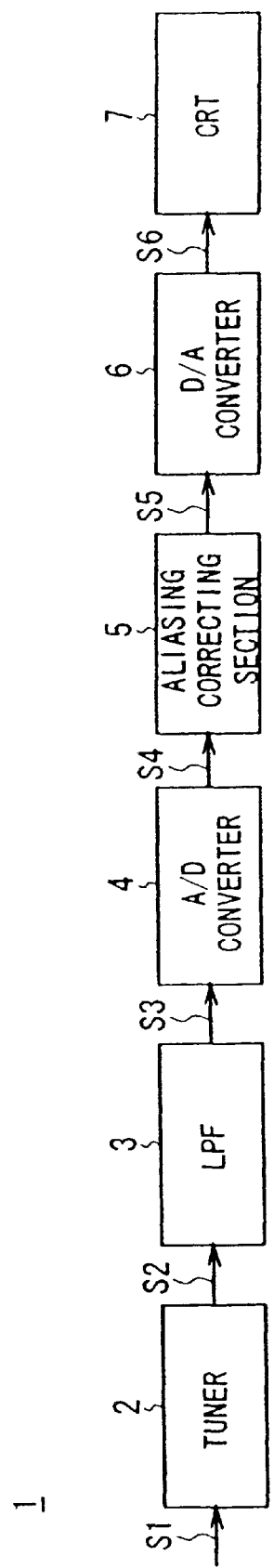
FIG. 4 is a block diagram illustrating one embodiment of a television receiver according to the present invention.

In FIG. 4, numeral 1 denotes the configuration of a television receiver as a whole. In the television receiver 1, receive signals S1 received by an antenna not shown are inputted to a tuner 2. The tuner 2 detects and demodulates a television broadcast signal of a desired channel from the receive signals S1, and sends out the resultant image signal S2 to an LPF (Low Pass Filter) 3.

The LPF 3, which is a pre-filter for making the image signal S2 satisfy the principle of sampling, limits the high frequency component of the image signal S2, and sends out the resultant image signal S3 to an analog-to-digital (A/D) converter 4. The A/D converter 4 samples the image signal S3 for A/D conversion, and sends out the resultant image data S4 to an ariasing correcting section 5.

The ariasing correcting section 5 as an image processing apparatus according to the present invention removes ariasing in the vertical direction from the image data S4 by the method of removing ariasing described above with reference to FIG. 1 and FIG. 3, and sends out the resultant ariasing-corrected image data S5 to a digital-to-analog (D/A) converter 6.

The D/A converter 6 performs the D/A conversion on the ariasing-corrected image data S5 to generate ariasing-corrected image signal S6 which is an analog signal, and sends it out to a CRT 7. The CRT 7 is to display an image having no ariasing which corresponds to the supplied ariasing-corrected image signal S6.

Incidentally, a circuit to perform, for example, Y/C separation and other required image processing may be provided between the tuner 2 and the LPF 3, or between the ariasing correcting section 5 and the D/A converter 6. The A/D converter 4 performs sampling at the frequency of the subcarrier if a composite color image signal before the Y/C separation are inputted as the image signal S3, while performing sampling at the frequency of 13.5 [MHz] if a composite signal which is comprised of Y (luminance) components and C (chroma) components after the Y/C separation is inputted.

(3) Configuration of the Ariasing Correcting Section

Figure 5:
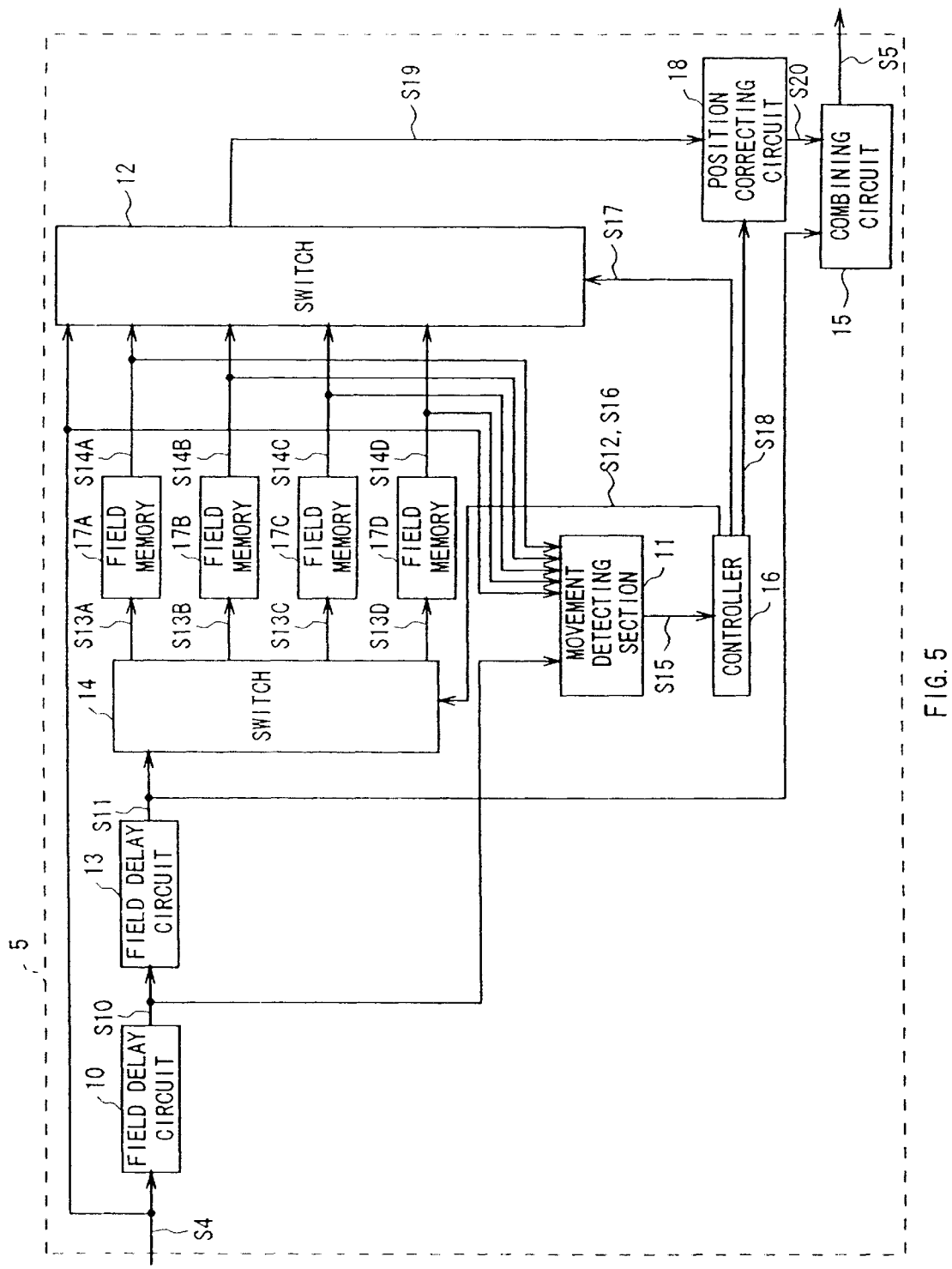
FIG. 5 is a block diagram illustrating the configuration of an ariasing correcting section.

FIG. 5 illustrates the configuration of the ariasing correcting section 5. In this instance, the ariasing correcting section 5 is provided with field memories 17A to 17D for storing whole image for each field in order to detect one movement vector by comparing it to a whole input image. And if memories are provided corresponding to respective areas obtained by dividing the whole screen, the movement vector of an image can be detected also with respect to the image which makes the same action in a part of screen. Further, it is assumed that the ariasing image data S5 which is output from the ariasing correcting section 5 is comprised of an image having twice the number of pixels in the vertical direction.

Hereinafter, the circuit configuration of the ariasing correcting section 5 will be concretely described. In the ariasing correcting section 5, the image data S4 are inputted to a field delay circuit 10 and a switch 12. The field delay circuit 10 generates current field image data S10 by delaying the image data S4 by one field, and sends it out to a movement detecting section 11 and a field delay circuit 13. The field delay circuit 13 generates image data S11 by delaying the current field image data S10 by one field, and sends it out to a switch 14 and a combining circuit 15. Therefore, relative to the current field image data S10, the image data S4 is positioned as image data of one field after and the image data 11 is positioned as a image data of one field before.

The switch 14, based on a control signal S12 from a controller 16, sends out the odd field of the N-th (N is a natural number) frame of the image data S11 to a field memory 17A as field image data S13A, sends out the even field of the N-th frame to a field memory 17B as field image data S13B, sends out the odd field of the (N+1)-th frame to a field memory 17C as field image data S13C, and sends out the even field of the (N+1)-th frame to a field memory 17D as field image data S13D.

The field memory 17A, after storing the field image data S13A, sends it out to the movement detecting section 11 and a switch 12 as field image data S14A. Similarly, the field memories 17B to 17D, after respectively storing the field image data S13B to S13D, send them to the movement detecting section 11 and the switch 12 as field image data S14B to S14D, respectively.

Figure 6:
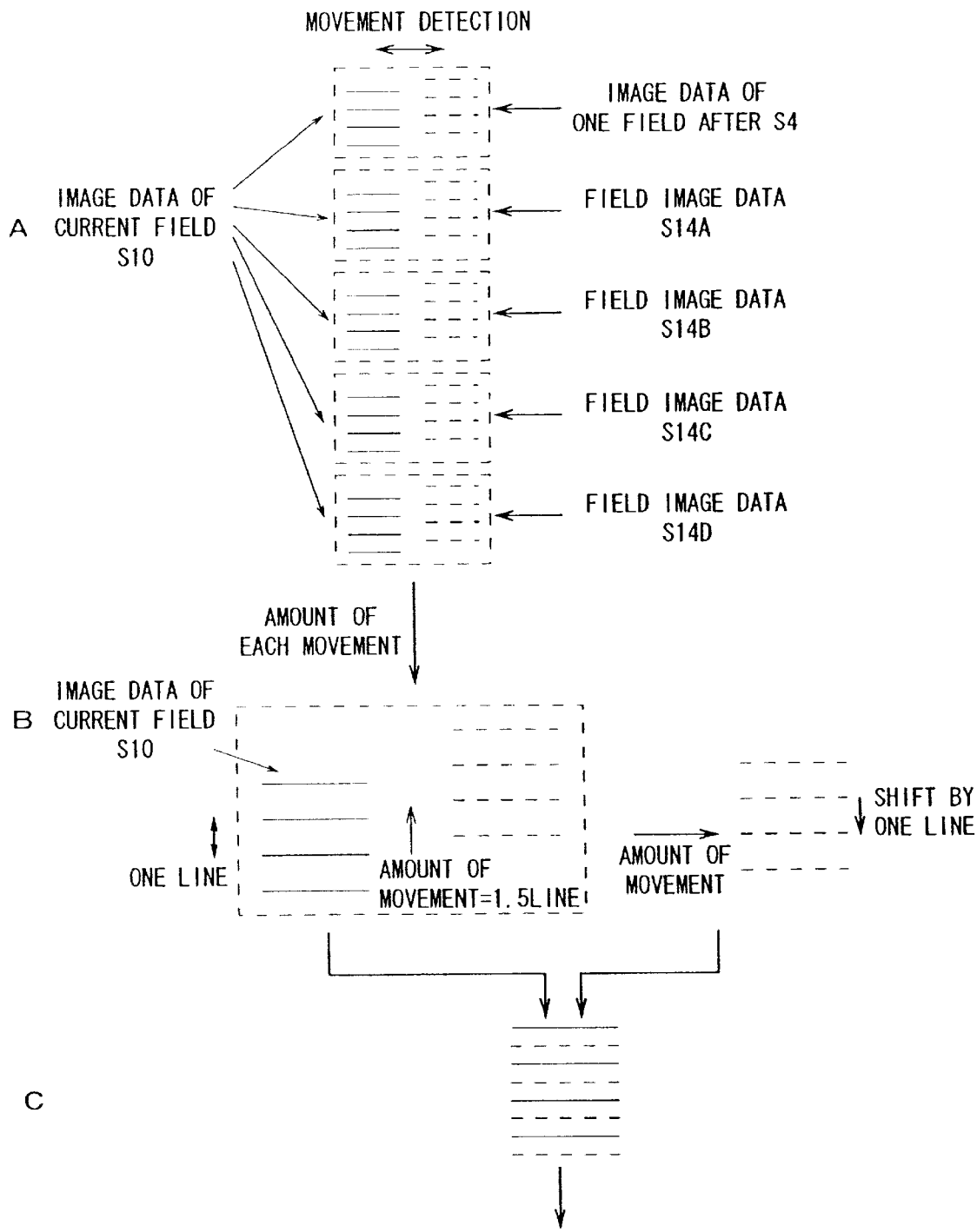
FIG. 6 is a schematic diagram explaining the process to generate ariasing-corrected image data.

The movement detecting section 11 detects the movement vector between the current field image data S10 and the field image data S14A stored in the field memory 17A, the movement vector between the current field image data S10 and the field image data S14B stored in the field memory 17B, the movement vector between the current field image data S10 and the field image data S14C stored in the field memory 17C, and the movement vector between the current field image data S10 and the field image data S14D stored in the field memory 17D, and then sends out the detected movement vector data S15 to the controller 16 (FIG. 6(A)). In this event, the movement detecting section 11 detects one movement vector for a whole screen.

Figure 7:
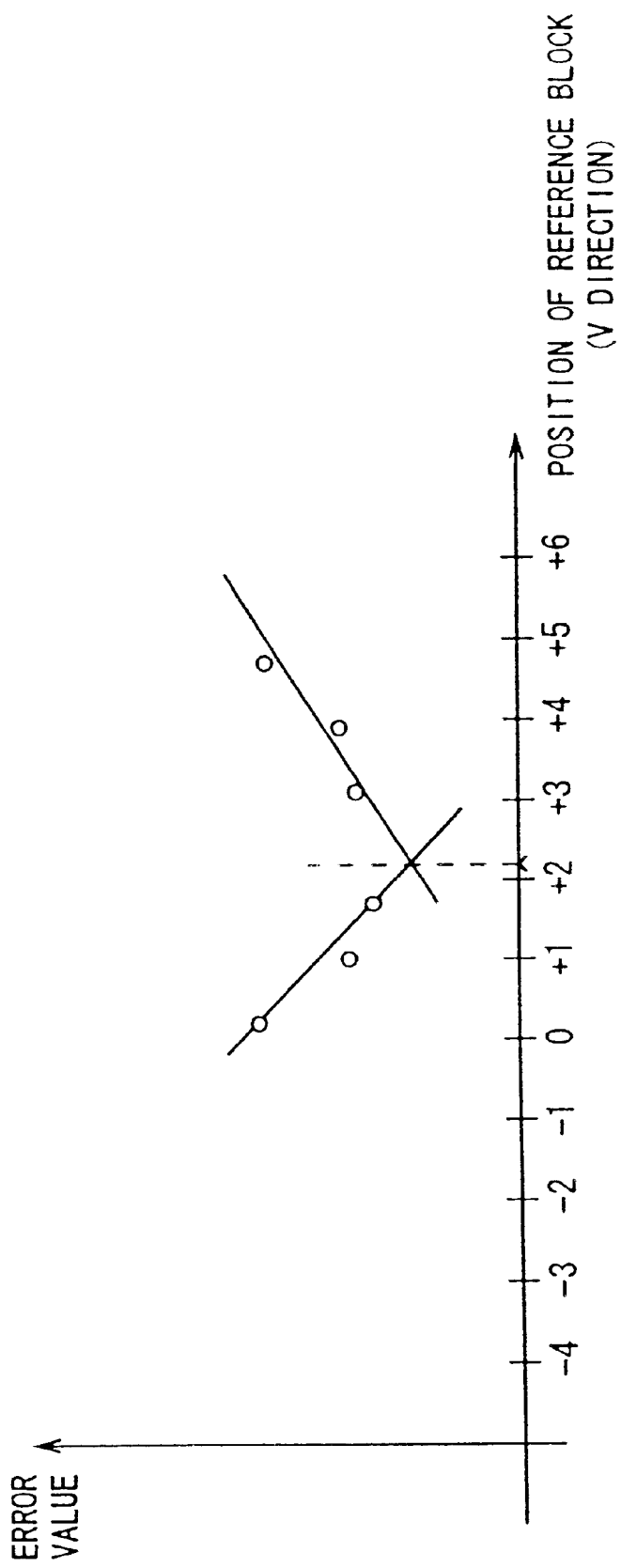
FIG. 7 is a schematic diagram explaining the detection of the amount of movement.

Incidentally, the movement detecting section 11 detects, with respect to the component in the direction in which ariasing has occurred, i.e. in the vertical direction of the whole screen, a movement vector in a smaller unit than a pixel forming the image data S4 inputted to the ariasing correcting section 5. Such a movement vector detecting operation of the movement detecting section 11 will be described below with reference to FIG. 7. Note that, FIG. 7 shows only error values, in which positions in the vertical direction are represented in a transverse axis by a pixel pitch. Further, the case of obtaining the movement vector between the field image data S14B stored in the field memory 17B out of the field image data S14A, S14B, S14C and S14D stored in the respective four field memories 17A, 17B, 17C, 17D, and the current image data S10 will be explained, and the movement vectors between the field image data S14A, 14C and 14D stored in the respective other field memories 17A, 17B and 17C, and the current field image data S10 are also obtained in a similar way.

First, the movement detecting section 11 selects a reference block comprised of a prescribed number of pixels from the current field, and also selects a block to be processed, which is the same in both size and shape as the reference block, from a filed image stored in the field memory 17B.

The movement detecting section 11 obtains differences between pixels at the corresponding positions in the reference block and the block to be processed, and calculates the sum of the absolute values of those differences (hereinafter, referred to as an error value). Further the movement detecting section 11 shifts the reference block of the current field to various positions in a pixel basis, and calculates the error value for each position to which the block is shifted.

And the movement detecting section 11 estimates, from the relationship between the position of the reference block and the error value in that position, the position of the reference block of the time when the error value is the smallest in interpolating error values (the position marked with x in the figure). The movement detecting section 11 regards the vertical component of the vector with respect to the position of the reference block having the smallest error value as the movement vector in a smaller unit than a pixel pitch.

Thus, the movement vector data between each of the field image data S14A, S14B, S14C and S14D stored in the respective field memories 17A, 17B, 17C and 17D and the current field image data S10 is detected.

Referring back to FIG. 5, the controller 16 selects, on the basis of the movement vector data S15 supplied from the movement detecting section 11, from the field image data S14A to 14D stored in the field memories 17A to 17D, concerning a size in the vertical direction of the movement vector, field image data in which the size smaller than a pixel is the smallest (close to 0). And if a plurality of field image data is selected, the controller 16 selects one of the plurality of field image data in which the sizes smaller than a pixel are the same or similar. As a result, the field memory storing the selected field image data is treated as a target of update. The controller 16 sends a switching signal S16 specifying thus obtained field memory to be updated, to the switch 14.

The switch 14 supplies new current field image data S10 to the field memory specified by the switching signal S16, to update field image data stored in the field memory.

For example, in the case where the sizes in the vertical direction of the movement vector of the current data S10 with respect to the field image data stored in the respective field memories 17A, 17B, 17C and 17D are 0.2 pixel, 1.5 pixels, 2.8 pixels and 4.1 pixels, respectively, and the size in the vertical direction of the movement vector of the field image data S4 of one field after the current field image data S10 is −1.1 pixels, the field image data S14D in which the size of the largest movement vector in the vertical direction is 4.1 pixels, is selected from the field image data S14D whose size of the movement vector in the vertical direction is 4.1 pixels, the field image data S14A whose size of the movement vector in the vertical direction is 0.2 pixel, and the field image data S14C whose size of the movement vector in the vertical direction is 2.8 pixels (in the case of this data, 0.2 pixel obtained as a difference with 3.0 pixels is considered as a size of decimal points in the size of the movement vector in the vertical direction).

Then, the controller 16 sends out the switching signal S16 which specifies the field memory 17D storing the selected field image data S14D as a target of update, to the switch 14. The switch 14 supplies the current field image data S10 of this time to the field memory 17D based on the switching signal S16 to update the field image data in the field memory 17D.

As a result, the sizes of movement vectors in the vertical direction between the field image data stored in the respective field memories 17A, 17B, and 17C and the current image data S10 are to be 1.3 pixels, 2.6 pixels and 3.9 pixels by adding 1.1 pixels, which is the size of the movement vector of the previous field image data S4 of one field after in the vertical direction, to the size of each previously detected movement vector. Further, the size of the movement vector in the vertical direction between the updated field image data S14D stored in the field memory 17D and the current field image data S10 becomes a value "1.1" obtained by reversing −1.1 which is the size of the movement vector of the previous field image data S4 of one field after in the vertical direction. In this connection, at this time, the size of movement vector of the new image data S4 of one field after in the vertical direction is taken to, for example, −1.3 pixels, depending on the movement of an image.

Then, under this situation, the field image data S14C having 3.9 pixels which is the largest size of the movement vector in the vertical direction is selected out of the field image data S14C in which the size of the movement vector in the vertical direction is 3.9 pixels (in the case of this data, 0.1 pixel obtained as a difference with 4.0 pixels is considered as decimal points of the size of the movement vector in the vertical direction), and the field image data S14D in which the size of the movement vector in the vertical direction is 1.1 pixels.

Then, the controller 16 sends out the switching signal S16 specifying the field memory 17C storing the selected field image data S14C as a target of update, to the switch 14. The switch 14 supplies the current field image data S10 of this time to the field memory 17C based on the switching signal S16 to update the field image data in the field memory 17D.

As a result, the sizes of the movement vector in the vertical direction between the field image data stored in the respective field memories 17A, 17B and 17D and the current image data S10 becomes to be 2.6 pixels, 3.9 pixels and 2.4 pixels by adding 1.3 pixels, which is the size of the movement vector of the previous field image data S4 of one field after in the vertical direction, to the respectively and previously detected movement vectors (1.3 pixels, 2.6 pixels, and 1.1 pixels) . Further, the size of the movement vector in the vertical direction between the updated field image data S14C in the field memory 17C and the current field image data S10 becomes a value "−1.3" obtained by reversing 1.3 which is the size of the movement vector of the previous field image data S4 of one field after in the vertical direction.

In this way, any of the field image data S14A to S14D in the field memories 17A to 17D are sequentially updated. In this connection, the method of updating file image data in a field memory is not limited to the method of writing in the actual current field image data S10, but for example, the result of averaging field image data stored in respective other field memories in accordance with the sizes of the respective movement vectors in the vertical directions may be written in.

Next, a method of setting resolution by selecting necessary field image data from the field image data S14A to S14D stored in the respective field memories 17A to 17D and the field image data S4 of one field after and by combining the selected data with the current field image data S10 will be described.

Returning to FIG. 5, the controller 16 selects data in which the size of the movement vector in the vertical direction smaller than a pixel is 0.5 pixel or close to this value, from the field image data S14A to S14D stored in the respective field memories 17A to 17D and the field image data S4 of one field after, based on the movement vector data S15 supplied from the movement detecting section 11, in order to generate the switching signal S17, and sends it out to the switch 12.

For example, in the case where the sizes of the movement vectors of the current image data S10 in the vertical direction with respect to the field image data stored in the respective field memories 17A, 17B, 17C and 17D are 0.2 pixel, 1.5 pixels. 2.8 pixels and 4.1 pixels, respectively, and further, the size of the movement vector of the image data S4 in the vertical direction with respect to the current field image data S10 is −1.1, the field image data S14B in which the size of the movement vector of the image data S4 in the vertical direction with respect to the current field image data S10 is 1.5 pixels, is selected. The field image data in which the size of the movement vector in the vertical direction smaller than a pixel is 0.5 pixel is selected in this way, so that the ariasing-corrected image data S5 having twice density (twice resolution) can be obtained in the combining circuit 15 described later. In this connection, if there is no field image data S14B having the movement vector of 1.5 pixels in the vertical direction, it may be possible to generate field image data having the movement vector of 1.5 pixels I the vertical direction from the field image data S14A and S14C respectively having the size of the neighboring movement vectors (0.2 pixel and 2.8 pixels) in the vertical direction.

Further, the controller 16 sends out the movement vector data S18 showing the movement vector of the selected field image to a position correcting circuit 18 based on the movement amount data S15 (FIG. 6(B)).

The switch 12 selects, on the basis of the switching signal S17 supplied from the controller 16, the field image data in which the size of the movement vector in the vertical direction smaller than a pixel is the closest to 0.5 pixel, and sends it out to the position correcting circuit 18 as selected field image data S19. In a similar way hereinafter, the switch 12, by successively selecting desired field image data S14 while switching the state of connection for each field on the basis of the switching signal S17 supplied from the controller 16, generates selected filed image data S19, and sends it out to the position correcting circuit 18.

The position correcting circuit 18 corrects the image position by shifting each field image of the selected field image data S19 on a pixel pitch basis, in accordance with the movement amount indicated by the movement vector data S18 in a pixel pitch unit, and sends out the resultant position-corrected image data S20 to the combining circuit 15. For example, as shown in FIG. 6(B), in the case where the selected field image data S19 has the movement vector of 1.5 pixels in the vertical direction, the selected field image data S19 is sifted by one pixel in the vertical direction, so that image data can be obtained at the position of 0.5 pixel, that is, at the position in which each pixel has twice density in the vertical direction.

Figure 8:
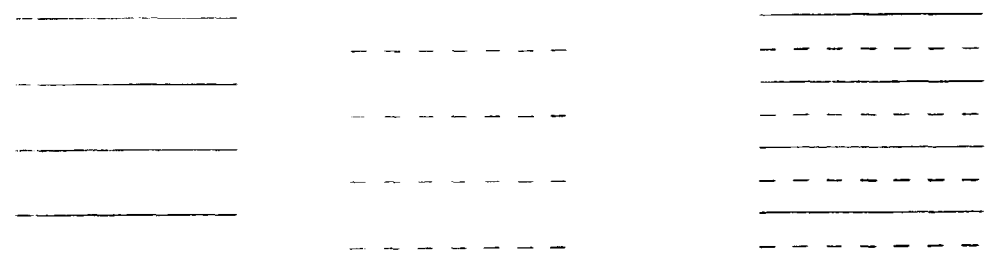
FIG. 8 is a schematic diagram explaining the ariasing-corrected image data.
Figure 8:
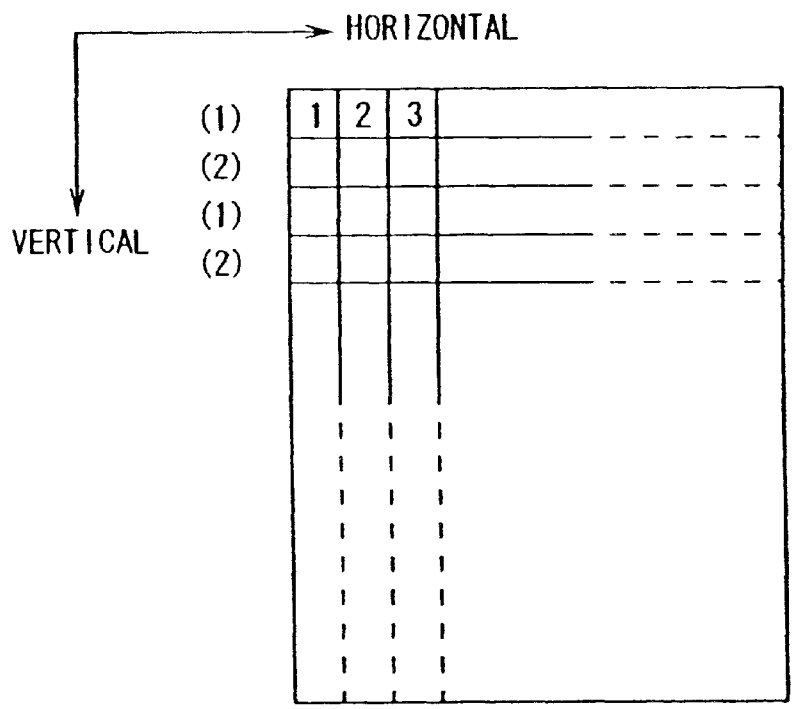

The combining circuit 15 generates ariasing-corrected image data S5 by combining the image data S11 supplied from the field delay circuit 13 and the position-corrected image data S20, and outputs it to the external (FIG. 6(C) and FIG. 8(A)). More specifically, as illustrated in FIG. 8(B), the combining circuit 15 generates the ariasing-corrected image data S5 by successively switching the image data S11 ((1) in the figure) and the position-corrected image data S20 ((2) in the figure) at prescribed timings line by line and outputting them.

Figure 9:
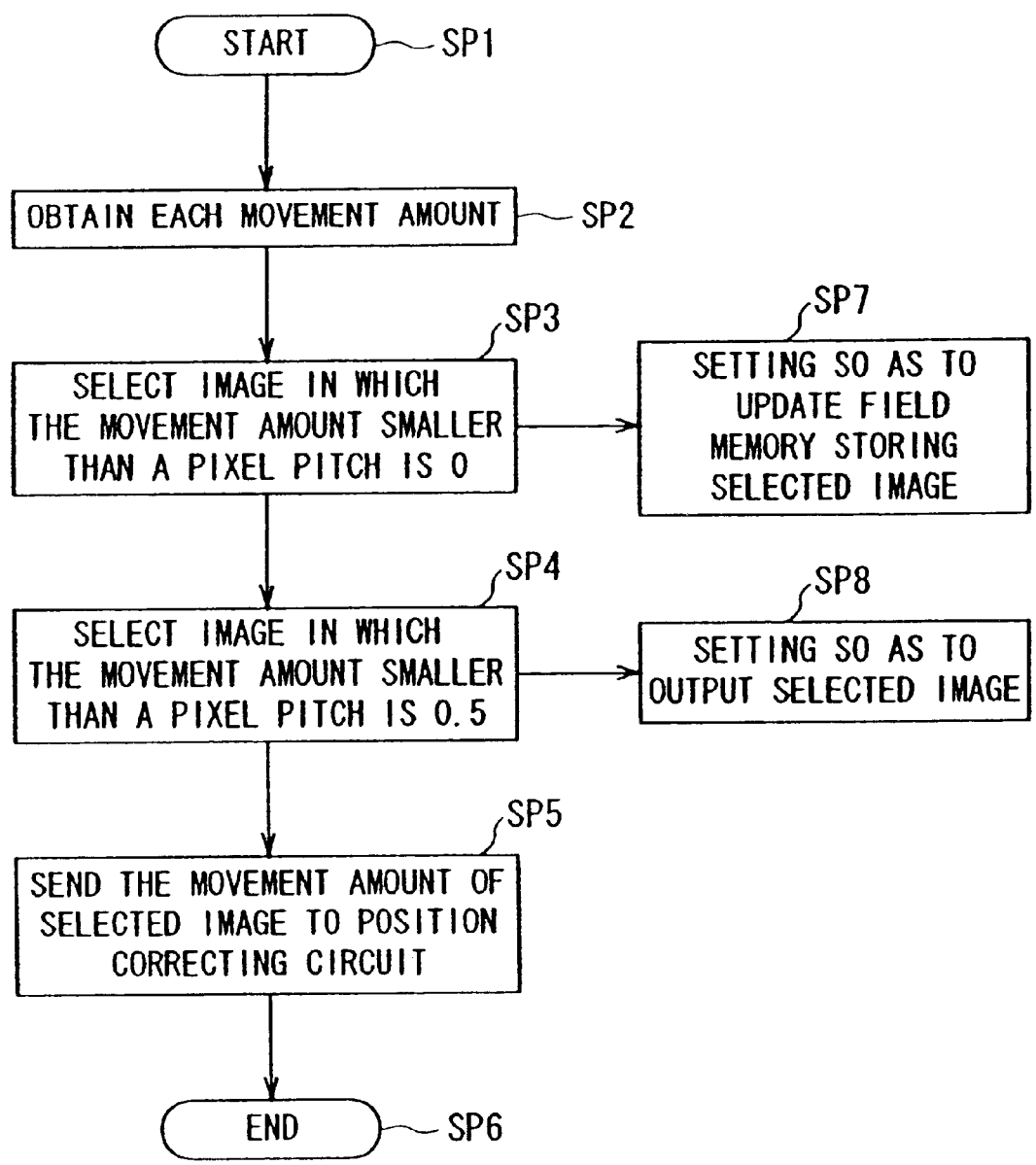
FIG. 9 is a flow chart showing the procedure of controlling the ariasing correcting section by a controller.

Here, the procedure of controlling the ariasing correcting section 5 by the controller 16 will be described with reference to a flow chart shown in FIG. 9. At step SP2 starting with step SP1, the controller 16 acquires movement amount data S15 indicating the movement vectors between the current image data S10, and the field image data S14 one field after the current field data and field image data S14A to 14D.

At step SP3, the controller 16 generates the switching signal S16 by selecting, out of the field image data S14A to S14D, one in which the size of the movement vector in the vertical direction smaller than a pixel pitch is the smallest (close to 0) or in the case where there are a plurality of selected field image data, one in which the size of the movement vector in the vertical direction is the largest out of the plurality of filed image data in which the sizes smaller than a pixel pitch are the same or close, and sends it out to the switch 14. At step SP4, the controller 16 generates the switching signal S17 by selecting, out of the field image data S4 and the field image data S14A to S14D, one in which the size of the movement vector in the vertical direction smaller than a pixel pitch is the closest to 0.5 pixel pitch, and sends it out to the switch 12.

At step SP5, the controller 16 sends out to the position correcting circuit 18 movement vector data S18 representing the movement vector of the selected field image. Next, the processing moves on to step SP6 and is completed. On the other hand, at step SP7, the switch 14 writes the current field image data S10 of this time in the field memory 17 indicated by the switching signal S16 out of the field memories 17A to 17D, to update the field image data S13 in the field memory. At step SP8, the switch 12 successively selects and outputs the field image data S14 based on the switching signal S17 out of the field image data S14A to S14D.

(3) Operation and Advantages

In the above-described configuration, the ariasing correcting section 5 stores a prescribed number of field images which are temporality before and after the current field image of the inputted image data S4, in the desired field memory 17. And the ariasing correcting section 5 detects the movement vectors of a prescribed number of field images stored in the field memory 17 with respect to the current field image, and selects an image in which the size of the movement vector in the vertical direction smaller than a pixel is the closest to 0.5 pixel, out of the images having the detected movement vectors.

The ariasing correcting section 5 corrects the positions of the selected field image by shifting it by a number of pixels corresponding to its movement amount on a pixel basis, and generates ariasing-corrected image data S5 comprised of field images having a number of pixels more than those of the respective field image of the input image data, for example, having high resolution of twice density, by combining these corrected field images and the current field image.

Thus, by storing a prescribed number of field images which are temporality before and after the current field image, in the field memory 17, selecting desired field images out of them and combining them with the current field image, field images having higher resolution than the current field image are generated.

The foregoing configuration makes it possible to generate field images having higher resolution than the current field image and thereby to generate field images having high picture quality and having no ariasing, by storing a prescribed number of field images which are temporality before and after the current field image, in the field memories 17, selecting desired field images out of them and combining them with the current field image.

In this connection, the method of setting resolution has been proposed in Japanese Patent Laid Open No. 298920/98 which was not published on the prior filing date of this application. However, in this application, the movement vector between each of the field image data S14A to S14D of the field memories 17A to 17D and the current field image data S10 is detected to set resolution, so that accumulation of positional correction error based on error of movement vector can be avoided and an image for setting resolution can be combined in the further proper position, as compared with the method, which is disclosed in Japanese Patent Laid Open No. 298920/98, of detecting a movement vector between image data of one frame after and before and correcting the position of the image data in the memory for setting resolution according to this detection.

(4) Other Embodiments

Note that, the above-described embodiment shows the case of setting resolution of the field image data S4 in the vertical direction. However, the present invention is not limited to this, and resolution in the horizontal direction can be set by using the component of the horizontal direction of the movement vector.

Also, the above-described embodiment shows the case in which the invention is applied to the ariasing correcting section 5 having the field memories 17A to 17D for four fields. However, the invention is not limited to this, and in short, it can be widely applied to an ariasing correcting section 5 having a plurality of field memories.

Further, the above-described embodiment shows the case of generating ariasing-corrected image data having twice density in the vertical direction from the field image data S4. However, the present invention is not limited to this, and image data having four times density in the vertical direction can be generated by selecting data in which the size of the movement vector smaller than a pixel (the size of decimal points) is, for example, 0.25 pixel, 0.5 pixel, 0.75 pixel or close to these values, as field image data to be selected in the switch 12.

Further, the above-described embodiment shows the case where the present invention is applied to the ariasing correcting section 5 of the television receiver 1. However, the present invention is not limited to this and is can be widely applied to devices which treat image data, such as a VTR (Video Tape Recorder), image CD (Compact Disc) player and DVD (Digital Versatile Disc) player.

Figure 10:
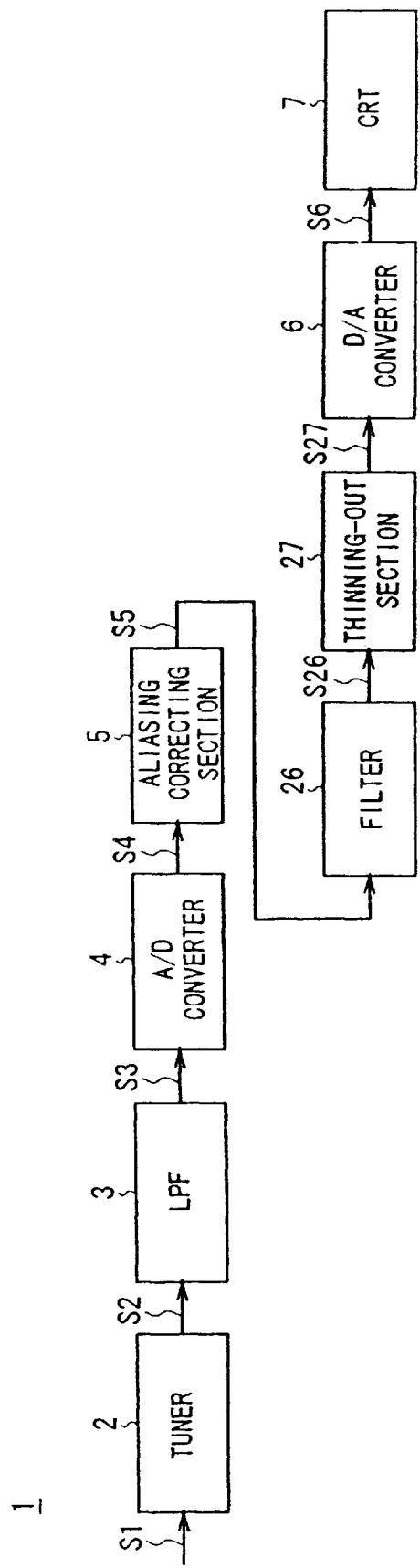
FIG. 10 is a block diagram showing the configuration in which a filter and a thinning-out section are added.
Figure 11:
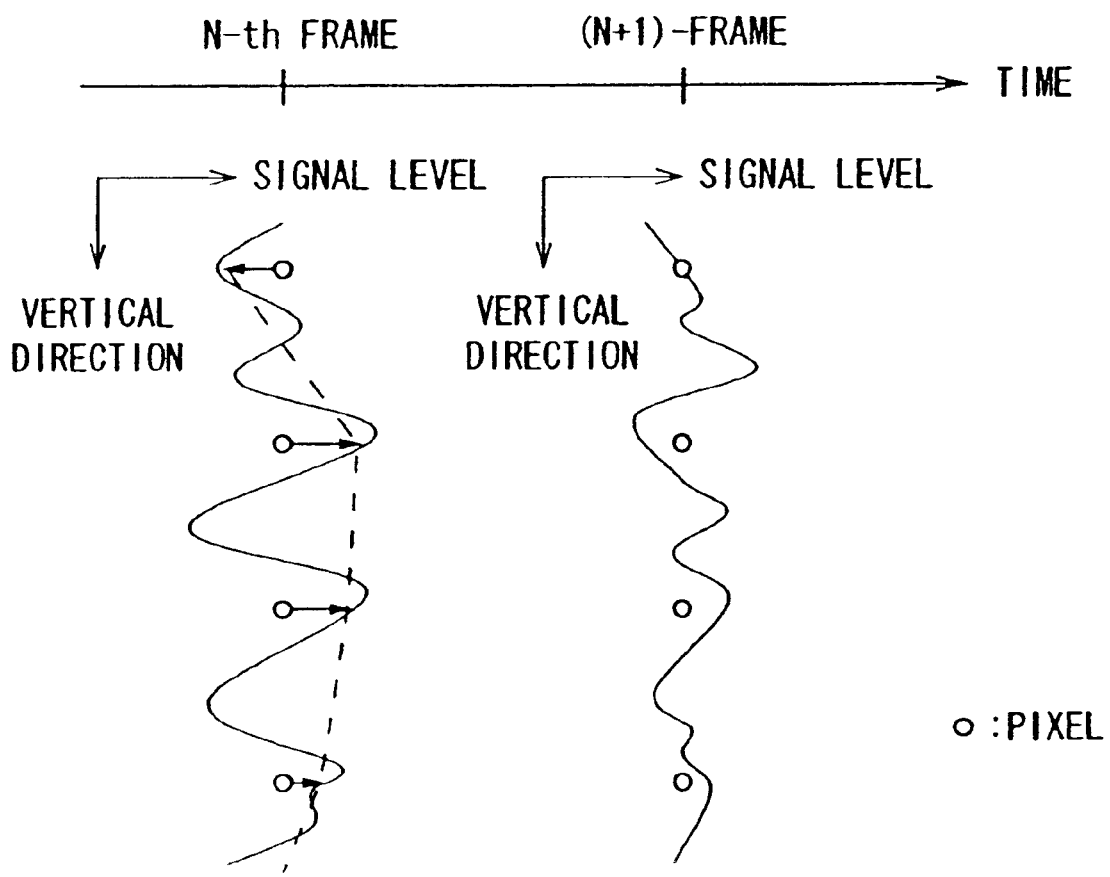
FIG. 11 is a schematic diagram explaining the principle of the occurrence of ariasing.

Further, the above-described embodiment shows the case of converting an image in the interlace system into an image in the non-interlace (progressive) system by obtaining an image having twice density in the vertical direction. However, the present invention is not limited to this and as shown in FIG. 10 where the same reference numerals are applied to parts corresponding to FIG. 4, it may be possible to obtain the image data S27 in the interlace system from the image data S5 in the non-interlace system by removing ariasing from image data S5 by filtering of the filter 26 and then, supplying the ariasing-removed image data S26 to the thinning-out section 27 to thin out pixels in the vertical direction.

As described above, according to the present invention, it is possible to generate an image having higher resolution than the current image by generating an image of second image data by combining the current image, which is first image data, with an image which is temporality different from that current image, and thus picture quality can be further improved by removing ariasing as compared with the conventional devices. In addition, in the progressive system in which image data is input in a frame unit, a plurality of frame memories is provided in the ariasing correcting section 5 to perform processing described in FIG. 5 to FIG. 9 in a frame unit, thereby making it possible to make resolution of image data higher based on the principle shown in FIG. 1.

Industrial Applicability

The present invention is suitably applied to an image processing apparatus and an image processing method for, for example, generating image data having high resolution from image data having low resolution.

We claim:

1. An image processing apparatus for generating second image data from first image data, comprising:
   a plurality of memories for storing a plurality of images temporality different from a current image of said first image data;
   a movement detecting section for detecting a movement between said current image and each of said images stored in said plurality of memories;
   an image data updating section for updating an image stored in any of said plurality of memories to said current image in accordance with each said movements detected by said movement detecting section;

a selecting section for selecting any of said plurality of images stored in said plurality of memories in accordance with each said movement detected by said movement detecting section;

an image data correcting section for correcting the position of the image selected by said selecting section in accordance with the movement of the image; and an image data combining section for generating said second image data having a number of pixels more than said first image data by combining the image corrected by said correcting section with said current image.

2. The image processing apparatus according to claim 1, wherein said image data updating section selects an image to be updated, from a plurality of images in which the sizes of movements detected by said movement detecting section smaller than a pixel pitch are the same or close, out of said plurality of images stored in said plurality of memories.

3. The image processing apparatus according to claim 1, wherein said image data updating section selects an image having the largest movement as an image to be updated, from a plurality of images in which the sizes of movements detected by said movement detecting section smaller than a pixel pitch are the same or close, out of said plurality of images stored in said plurality of memories.

4. The image processing apparatus according to claim 1, wherein said image data updating section selects an image in which the size of movement detected by said movement detecting section smaller than a pixel pitch is 0 or close to 0, from said plurality of images stored in said plurality of memories as an image to be updated.

5. The image processing apparatus according to claim 1, wherein:

said movement detecting section detects a movement in the vertical direction between said current image and each of said images stored in said plurality of memories;

said image data correcting section corrects the position of the image selected by said selecting section in accordance with the movement in the vertical direction of the image; and said image data combining section combines the image corrected in the vertical direction by said correcting section with said current image to generate said second image data having a number of pixels more than that of said first image data.

6. An image processing apparatus for generating second image data from first image data, comprising:

a plurality of memories for storing a plurality of images temporality different from a current image of said first image data;

a movement detecting section for detecting a movement between said current image and each of said images stored in said plurality of memories;

an image data updating section for selecting an image in any of said plurality of memories in accordance with each said movement detected by said movement detecting section, and for updating the selected image based on other images stored in said plurality of memories;

a selecting section for selecting any of said plurality of images stored in said plurality of memories in accordance with each said movement detected by said movement detecting section;

an image data correcting section for correcting the position of the image selected by said selecting section in accordance with the movement of the image; and an image data combining section for generating said second image data having a number of pixels more than said first image data by combining the image corrected by said correcting section with said current image.

7. The image processing apparatus according to claim 6, wherein said image data updating section performs said updating by averaging at least two images out of other images stored in said plurality of memories in accordance with each of movements of said two images.

8. An image processing apparatus for removing aliasing from first image data, comprising:

a plurality of memories for storing a plurality of images temporality different from a current image of said first image data;

a movement detecting section for detecting a movement between said current image and each of said images stored in said plurality of memories;

an image data updating section for updating an image stored in any of said plurality of memories to said current image in accordance with each said movement detected by said movement detecting section;

a selecting section for selecting any of said plurality of images stored in said plurality of memories in accordance with each said movement detected by said movement detecting section;

an image data correcting section for correcting the position of the image selected by said selecting section in accordance with the movement of the image;

an image data combining section for generating a second image data having a number of pixels more than said first image data by combining the image corrected by said correcting section with said current image;

a filter for removing aliasing from the combined image data combined by said image data combining section; and an image data thinning-out section for generating said first image data having no aliasing by thinning out said combined image data from which aliasing is removed through said filter.

9. An image processing method of generating second image data from first image data, comprising the steps of:

storing a plurality of images temporality different from a current image of said first image data in a plurality of memories;

detecting a movement between said current image and each of said images stored in said plurality of memories;

updating an image stored in any of said plurality of memories to said current image in accordance with each detected movement;

selecting any of said plurality of images stored in said plurality of memories in accordance with each detected movement;

correcting the position of the image selected in said selecting step in accordance with the movement of the image; and generating said second image data having a number of pixels more than said first image data by combining said corrected image with said current image.

10. The image processing method according to claim 9, wherein in said step of updating said image, an image to be updated is selected from a plurality of images in which the sizes of detected movements smaller than a pixel pitch are the same or close, out of said plurality of images stored in said plurality of memories.

11. The image processing method according to claim 9, wherein in said step of updating said image, an image having the largest movement is selected as an image to be updated, from a plurality of images in which the sizes of detected movements smaller than a pixel pitch are the same or close, out of said plurality of images stored in said plurality of memories.

12. The image processing method according to claim 9, wherein in said step of updating said image, an image in which the size of said detected movement smaller than a pixel pitch is 0 or close to 0 is selected as an image to be updated, from said plurality of images stored in said plurality of memories.

13. The image processing method according to claim 9, wherein:

in said step of detecting said movement, a movement in the vertical direction between said current image and each of said images stored in said plurality of memories is detected;

in said step of correcting said image, the position of the selected image is corrected in accordance with the movement in the vertical direction of the image; and in said step of combining said image, the image corrected in the vertical direction is combined with said current image to generate said second image data having a number of pixels more than that of said first image data.

14. An image processing method of generating second image data from first image data, comprising the steps of:

storing a plurality of images temporality different from a current image of said first image data in a plurality of memories;

detecting a movement between said current image and each of said images stored in said plurality of memories;

selecting an image in any of said plurality of memories in accordance with each detected movement, and updating the selected image based on other images stored in said plurality of memories;

selecting any of said plurality of images stored in said plurality of memories in accordance with each detected movement;

correcting the position of the image selected in said selecting step in accordance with the movement of the image; and generating said second image data having a number of pixels more than said first image data by combining said corrected image with said current image.

15. The image processing method according to claim 14, wherein in said step of updating said image, said update is performed by averaging at least two images out of other images stored in said plurality of memories in accordance with each of movements of said two images.

16. An image processing method of removing aliasing from first image data, comprising the steps of:

storing a plurality of images temporality different from a current image of said first image data in a plurality of memories;

detecting a movement between said current image and each of said images stored in said plurality of memories;

updating an image stored in any of said plurality of memories to said current image in accordance with each said detected movement;

selecting any of said plurality of images stored in said plurality of memories in accordance with each said detected movement;

correcting the position of the selected image in accordance with the movement of the image;

generating a second image data having a number of pixels more than said first image data by combining the corrected image with said current image;

removing aliasing from said combined image; and generating said first image data having no aliasing by thinning out said combined-image from which aliasing is removed.

\* \* \* \* \*